United States Patent
Kattepur et al.

(10) Patent No.: US 10,146,656 B2
(45) Date of Patent: *Dec. 4, 2018

(54) SERVICE DEMAND BASED PERFORMANCE PREDICTION USING A SINGLE WORKLOAD

(71) Applicant: Tata Consultancy Services Limited, Mumbai (IN)

(72) Inventors: Ajay Kattepur, Mumbai (IN); Manoj Karunakaran Nambiar, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,580

(22) Filed: Feb. 15, 2017

(65) Prior Publication Data
US 2017/0235663 A1    Aug. 17, 2017

(30) Foreign Application Priority Data
Feb. 16, 2016 (IN) .............................. 201621005425

(51) Int. Cl.
    *G06F 9/44* (2018.01)
    *G06F 11/34* (2006.01)

(52) U.S. Cl.
    CPC ...... *G06F 11/3447* (2013.01); *G06F 11/3433* (2013.01); *G06F 2201/87* (2013.01)

(58) Field of Classification Search
    None
    See application file for complete search history.

(56) References Cited

U.S. PATENT DOCUMENTS

| 7,296,256 B2 | 11/2007 | Liu et al. |
| 8,170,845 B2 | 5/2012 | Kumar et al. |
| 8,726,243 B2 * | 5/2014 | Nasuto ............... G06F 11/3404 717/127 |
| 2006/0230391 A1 * | 10/2006 | Alexander, III .... G06F 11/3616 717/130 |
| 2008/0115014 A1 | 5/2008 | Vaidyanathan et al. |
| 2008/0133435 A1 | 6/2008 | Chintalapti et al. |
| 2011/0145795 A1 * | 6/2011 | Khanapurkar ...... G06F 11/3414 717/126 |
| 2012/0072544 A1 * | 3/2012 | Pankratov ........... G06F 11/3409 709/219 |

(Continued)

*Primary Examiner* — Insun Kang
(74) *Attorney, Agent, or Firm* — Finnegan, Henderson, Farabow, Garrett & Dunner LLP

(57) ABSTRACT

Systems and methods for service demand based performance prediction using a single workload is provided to eliminate need for load testing. The process involves identifying a range of concurrencies for the application under test; capturing a single workload pertaining to the application under test; and iteratively performing for the identified range of concurrencies: generating an array of one or more predefined CPU performance metrics based on the captured single workload; generating an array of service demands based on the captured single workload and the generated array of the one or more pre-defined CPU performance metrics; computing an array of throughput based on the generated array of service demands; and updating the generated array of the one or more pre-defined CPU performance metrics based on the computed array of throughput.

15 Claims, 10 Drawing Sheets

(56) References Cited

U.S. PATENT DOCUMENTS

| | | | |
|---|---|---|---|
| 2012/0143588 A1* | 6/2012 | Liu | G06F 11/3414 |
| | | | 703/22 |
| 2013/0185433 A1* | 7/2013 | Zhu | H04L 67/303 |
| | | | 709/226 |
| 2014/0006623 A1* | 1/2014 | Hohndel | G06F 9/5011 |
| | | | 709/226 |
| 2015/0012634 A1* | 1/2015 | Zhu | H04L 67/303 |
| | | | 709/223 |
| 2015/0150020 A1 | 5/2015 | Duttagupta et al. | |
| 2015/0347282 A1* | 12/2015 | Wingfors | G06F 11/3688 |
| | | | 717/125 |
| 2016/0232082 A1* | 8/2016 | Bhattacharya | G06F 11/3452 |
| 2016/0314064 A1* | 10/2016 | Moretto | G06F 11/3688 |
| 2017/0153963 A1* | 6/2017 | Chahal | G06F 11/3485 |

* cited by examiner

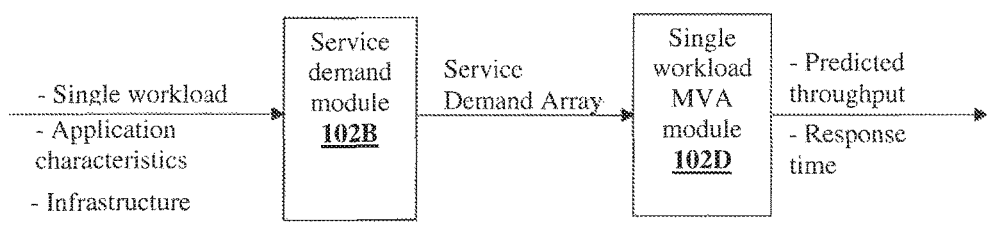
FIG.5
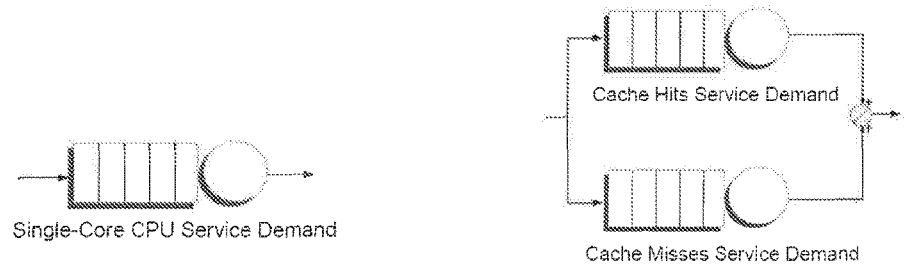
FIG.6A
PRIOR ART
FIG.6B

SERVICE DEMAND BASED PERFORMANCE PREDICTION USING A SINGLE WORKLOAD

PRIORITY CLAIM

This U.S. patent application claims priority under 35 U.S.C. § 119 to: India Application No. 201621005425, filed on Feb. 16, 2016. The entire contents of the aforementioned application are incorporated herein by reference.

TECHNICAL FIELD

This disclosure relates generally to performance modeling of applications and more particularly to systems and methods that predict performance of multi-tiered web applications using a single work load.

BACKGROUND

Adequate number of input samples, varying service demands and heterogeneous hardware architectures are a major challenge to performance prediction of applications. Performance estimation of most applications are typically performed using load/stress testing techniques. This involves a rather long and arduous process of requirements gathering, test scripting, virtual user generation, test running, test validation and analysis. Moreover, near production deployment environments are needed which are impractical in many cases. Standard tools such as HP Loadrunner and IBM® Rational® Performance Tester, employed in the industry, involve expensive licensing costs. Depending upon the complexity of the applications, it may entail 4 to 12 weeks to run such tests in industrial settings. A significant portion of time is taken in generating accurate scripts that involves recording transactions, encoding unique visitors and enabling large data pools to be fed into a chosen testing platform. Moreover, tests need to be run long enough, repeated and validated in order to be accurate. Such lengthy timelines for performance assurance are not ideal, especially in conjunction with DevOps and agile delivery paradigms which are of focus engineering today.

The alternatives such as queuing analysis and Mean Value Analysis (MVA) algorithms need accurate sample points. As service demand or time needed to process one request by CPU/Disk/Network varies with workload, unless the MVA is accurately fed a number of inputs, performance prediction cannot be accurate. To make the prediction accurate, load tests at higher concurrency would have to be incorporated.

SUMMARY

Embodiments of the present disclosure present technological improvements as solutions to one or more of the above-mentioned technical problems recognized by the inventors in conventional systems. Systems and methods of the present disclosure enable predicting performance of applications, particularly multi-tiered web applications wherein service demands or time required by associated network resources and hardware such as Central Processing Unit (CPU) and storage disk vary with workload and need to be accurately modeled in order to predict performance at higher loads. The present disclosure facilitates performance prediction of an application under test, particularly CPU-bound applications, using a single workload.

In an aspect, there is provided a method for service demand based performance prediction of an application under test using a single workload, the method comprising; identifying a range of concurrencies for the application under test; capturing a single workload pertaining to the application under test; and iteratively performing for the identified range of concurrencies: generating an array of one or more pre-defined CPU performance metrics based on the captured single workload; generating an array of service demands based on the captured single workload and the generated array of the one or more pre-defined CPU performance metrics; computing an array of throughput based on the generated array of service demands; and updating the generated array of the one or more pre-defined CPU performance metrics based on the computed array of throughput.

In another aspect, there is provided a system for service demand based performance prediction of an application under test using a single workload, the system comprising: one or more processors; one or more data storage devices operatively coupled to the one or more processors and configured to store instructions configured for execution by the one or more processors to: identify a range of concurrencies for the application under test; capture a single workload pertaining to the application under test; and iteratively performing for the identified range of concurrencies: generate an array of one or more pre-defined CPU performance metrics based on the captured single workload; generate an array of service demands based on the captured single workload and the generated array of the one or more pre-defined CPU performance metrics; compute an array of throughput based on the generated array of service demands; and update the generated array of the one or more pre-defined CPU performance metrics based on the computed array of throughput.

In yet another aspect, there is provided a computer program product for processing data, comprising a non-transitory computer readable medium having program instructions embodied therein for identifying a range of concurrencies for the application under test; capturing a single workload pertaining to the application under test; and iteratively performing for the identified range of concurrencies: generating an array of one or more pre-defined CPU performance metrics based on the captured single workload; generating an array of service demands based on the captured single workload and the generated array of the one or more pre-defined CPU performance metrics; computing an array of throughput based on the generated array of service demands; and updating the generated array of the one or more pre-defined CPU performance metrics based on the computed array of throughput.

In an embodiment of the present disclosure, the one or more pre-defined CPU performance metrics are cache-hit rate and cache-miss rate.

In an embodiment of the present disclosure, generating an array of one or more pre-defined CPU performance metrics is based on the one or more pre-defined CPU performance metrics and throughput derived from the captured single workload.

In an embodiment of the present disclosure, computing an array of throughput comprises incorporating the generated array of service demands into a queueing network or a simulation model.

In an embodiment of the present disclosure, the queueing network is analyzed by recursively utilizing the updated array of the one or more pre-defined CPU performance metrics by Mean Value Analysis (MVA).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates a schematic flow diagram of a service demand modeling process in accordance with an embodiment of the present disclosure;

FIG. 6A illustrates a schematic representation of a conventional single-core CPU service demand model;

FIG. 6B illustrates a schematic representation of a new decomposed model based on cache-hit rate and cache-miss rate service demands in accordance with the present disclosure;

Figure 1:
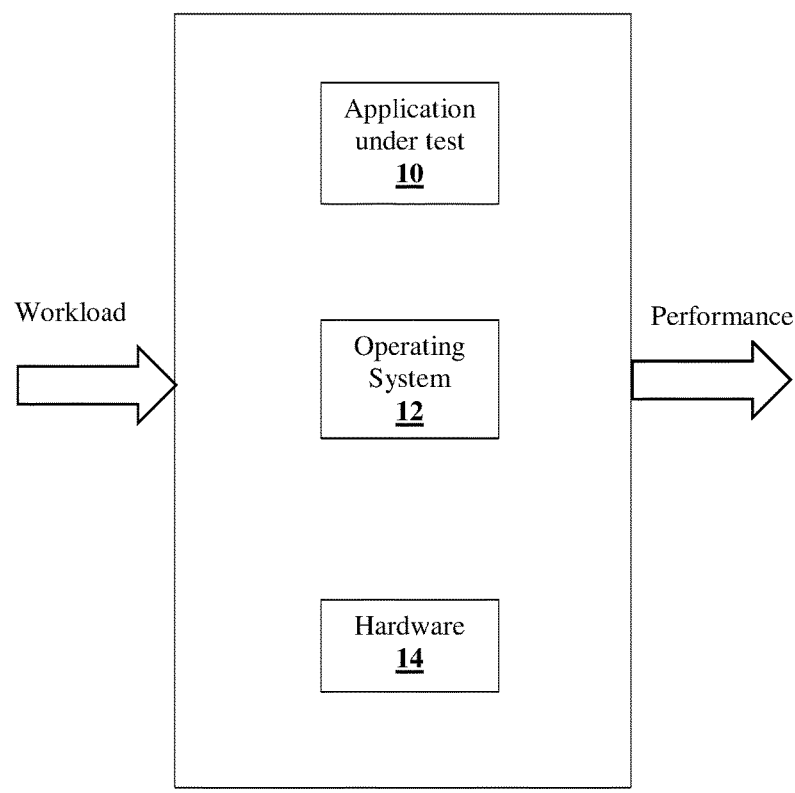
FIG. 1 illustrates an illustrates a schematic representation of an application under test, as known in the art.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Performance estimation of multi-tier online transaction processing (OLTP) applications forms an integral part of the software development life-cycle. Web based applications deployed by most enterprises make use of multi-tiered architectures. As performance of applications can be hampered by bottlenecks at the web, application or database tier servers, accurate pre-deployment capacity planning is necessary.

Prediction tools known in the art typically require service demands (time required to serve one request by CPU/Disk/Network resources) as inputs. Service demands vary with workload and require multiple points for accurate characterization. Collecting such inputs involves load testing at multiple sample points: once again bringing up overheads of accurate scripting, test repetition and collection of metrics rendering performance modeling ineffectual.

The present disclosure provides systems and methods to model service demand variation accurately, so that with just a single user test or a single workload as input, performance of an application under test can be predicted. It is assumed that the CPU of one of the tiers is the cause of the bottleneck. Identifying and utilizing particular CPU performance metrics that are relevant for estimating CPU utilization, a regression function that models variation of CPU service demands with workloads is generated. Inputting the service demand model to a modified Mean Value Analysis (MVA) technique generates an accurate performance output with just a single workload thereby saving time and effort needed for conducting load tests as the modified MVA can estimate performance for diverse application/hardware characteristics.

In accordance with the present disclosure, systems and methods are provided to model the variation in underlying service demands. As accurate service demands are required by most performance models (analytical or simulation models that can take as input varying service demands indexed by some measure of workload), modeling the variation using a minimum number of underlying tests is a challenge addressed in the present disclosure. Furthermore, systems and methods of the present disclosure enable estimation of service demands using merely a single-user test. In the context of the present disclosure, single user test refers to tests that can be collected by either generating a single virtual load-injecting user or by having a user click through pages in a transaction. This relieves the dependence on higher workload performance tests to estimate bottleneck throughput/utilization, which entails time, effort and licensing costs. The expressions "single-user test" and "workload" may be interchangeably used throughout the disclosure and in the context of the present disclosure refers to throughput/response times of application pages, utilization of CPU/Disk/Network and one or more CPU performance metrics when a single user accesses an application under test.

TABLE 1

Load testing measurement Categories

| Test | Users | Type | No. of User Iterations | Time Period | State | Measurements of Interest |
|---|---|---|---|---|---|---|
| Single-User | One | Real | One | Short | Transient | Service Demands |
| Single-User | One | Real/Virtual | Multiple | Long | Steady | Service Demands |
| Load Tests | Multiple | Virtual | Multiple | Long | Steady | Throughput, Response Time, Utilization |

As shown in Table 1, the focus of the present disclosure is on single-user tests or single workload, where steady-state metrics may be obtained with a single user, without need for load tests. While other resources (Disk/Network) also demonstrate service demands varying with workloads, the present disclosure is directed towards variation of CPU service demands. To identify a trend in service demands, multiple CPU performance metrics including instructions/second, cache hits/misses, branch prediction, stalled cycles and the like are analyzed. By utilizing statistical techniques such as Principal Component Analysis (PCA) on the underlying CPU performance metrics, an accurate estimate of metrics that correlate with CPU service demand variations are extracted. Using multiple applications deployed under varying CPU hardware configurations, a linear regression model that captures service demand variations with workload is generated. The resulting service demand model may be applied in conjunction with iterative or simulation based performance prediction algorithms.

Mean Value Analysis (MVA) technique that is used in conjunction with Queuing Networks can iteratively update queue size to predict performance at higher concurrencies. MVA also requires service demands as an input, which can be derived using mean utilization and throughput observed at a given concurrency. In the present disclosure, an iterative update model based on MVA to predict throughput at higher concurrency given service demands measured at a single workload is disclosed.

Referring now to the drawings, and more particularly to FIGS. 1 through 11, where similar reference characters denote corresponding features consistently throughout the figures, there are shown preferred embodiments and these embodiments are described in the context of the following exemplary system and method.

Figure 2:
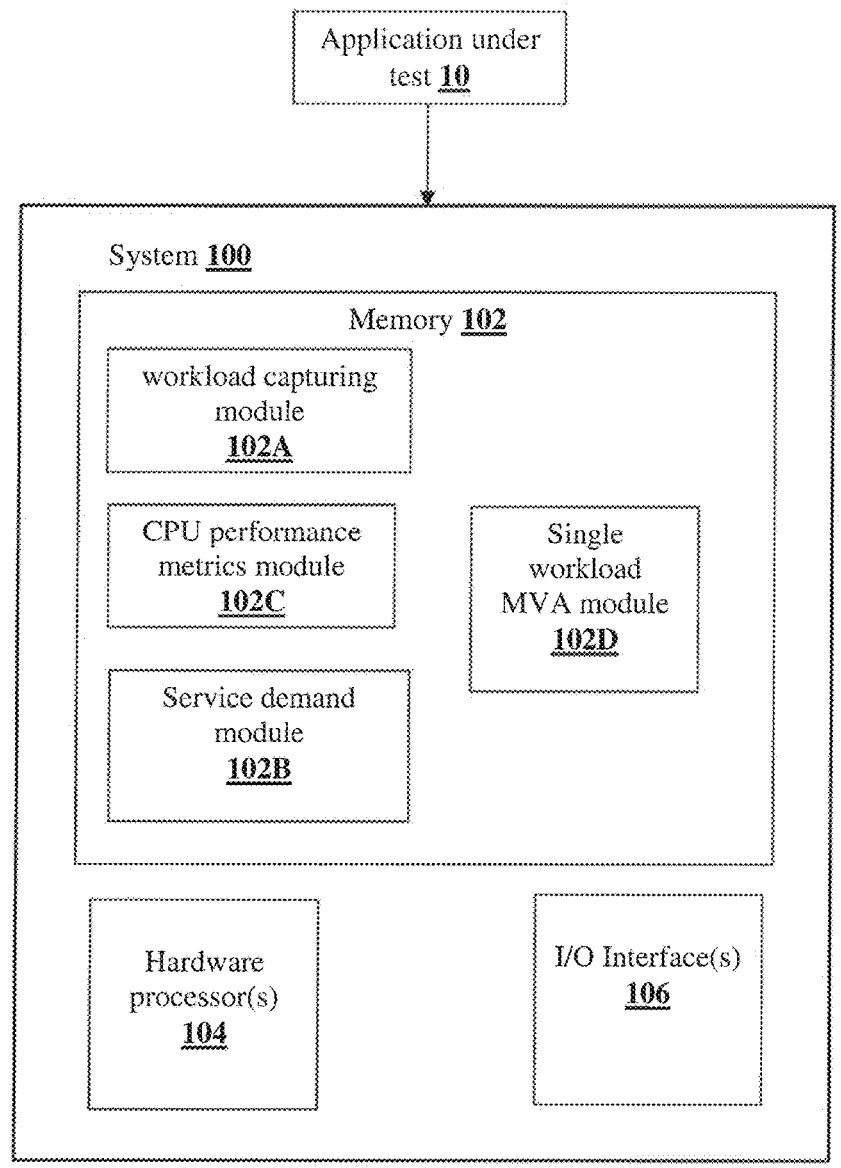
FIG. 2 illustrates an exemplary embodiment of a system for service demand based performance prediction of the application under test using a single workload in accordance with an embodiment of the present disclosure.
Figure 3:
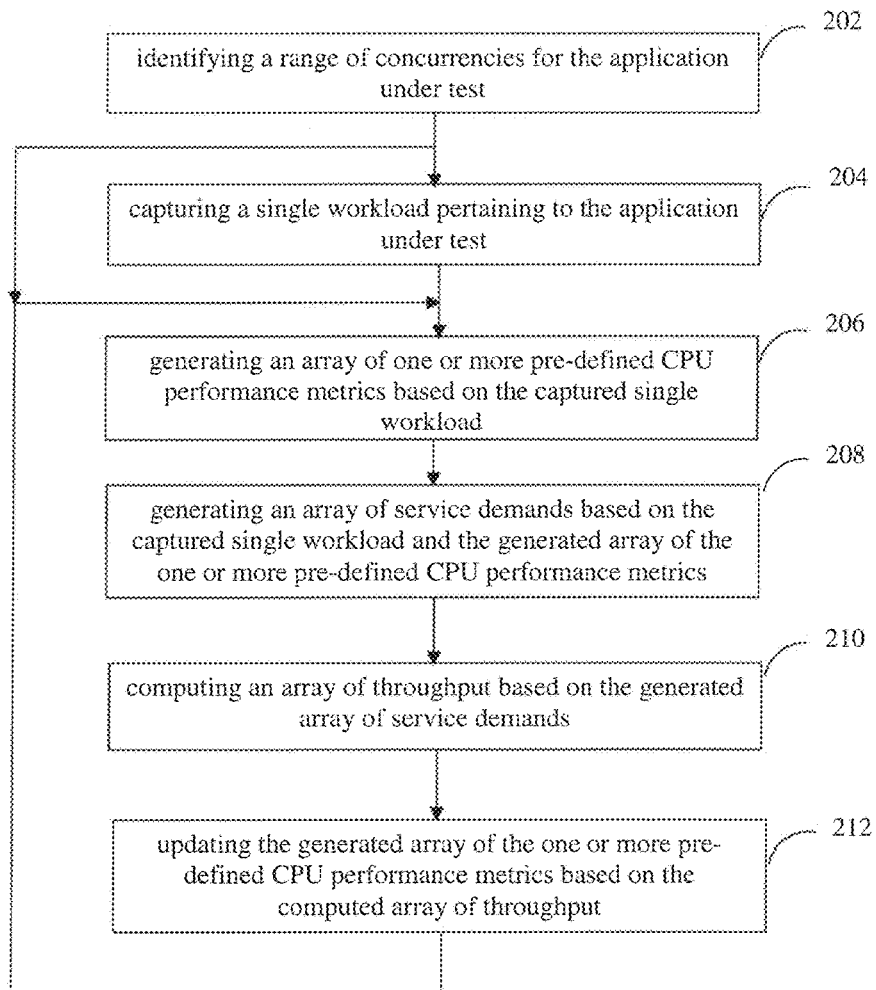
FIG. 3 is an exemplary flow diagram illustrating a method for service demand based performance prediction of an application under test using a single workload in accordance with an embodiment of the present disclosure.

FIG. 1 illustrates a schematic representation of an application under test 10, as known in the art hosted on an operating system 12 with associated hardware 14. FIG. 2 illustrates an exemplary embodiment of a system 100 for service demand based performance prediction of the application under test 10 using a single workload, in accordance with an embodiment of the present disclosure and FIG. 3 is an exemplary flow diagram illustrating a method for service demand based performance prediction of an application under test 10 using a single workload in accordance with an embodiment of the present disclosure.

In an embodiment, the system 100 includes one or more processors 104, communication interface device(s) or input/output (I/O) interface(s) 106, and one or more data storage devices or memory 102 operatively coupled to the one or more processors 104 for each of Client Tier, Business Logic Tier and Database Access Tier (not particularly shown). The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented on a server or in a variety of computing systems, such as a laptop computer, a desktop computer, a notebook, a workstation, a mainframe computer, a server, a network server, cloud, hand-held device and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules 102A through 102D of the system 100 can be stored in the memory 102.

The steps of the method illustrated in FIG. 3 of the present disclosure will now be explained with reference to the components of the system 100 as depicted in FIG. 2. At step 202, a range of concurrencies for the application under test 10 are identified. At step 204, a workload capturing module 102A is configured to capture a single workload pertaining to the application under test 10.

Figure 4A:
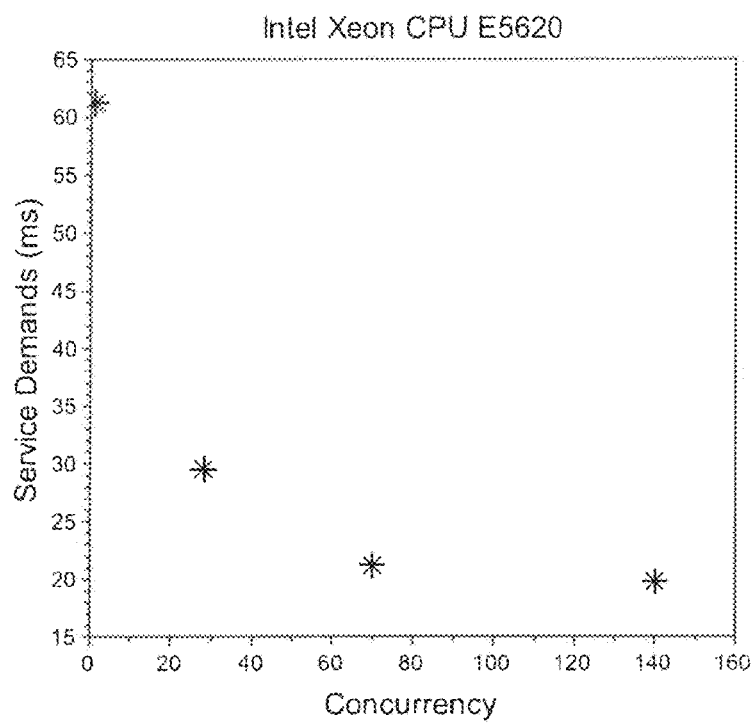
FIG. 4A and FIG. 4B illustrate experimental trends observed with CPU service demands varying with concurrency for two exemplary Intel® Xeon® processors.
Figure 4B:
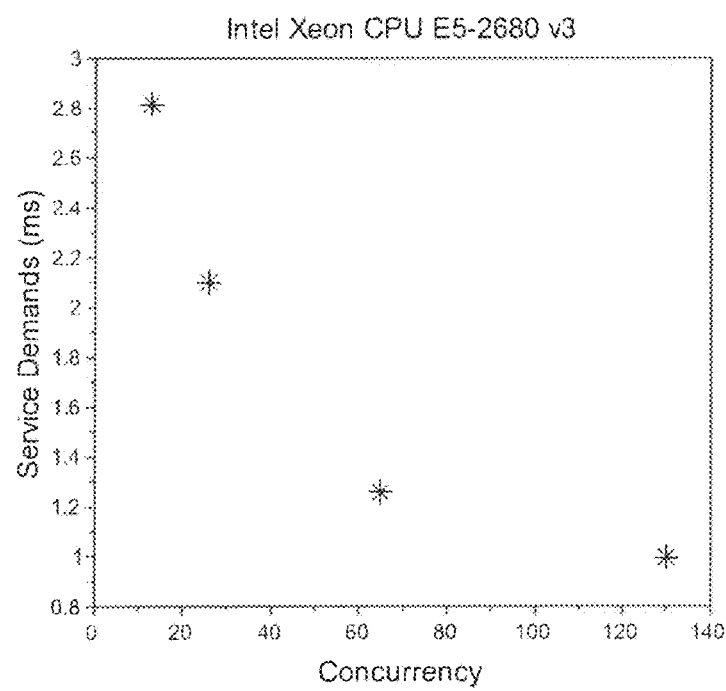

The present disclosure provides an analysis on how one or more CPU performance metrics are predefined for proceeding further with the method illustrated in FIG. 3. FIGS. 4A and 4B illustrate experimental trends observed with CPU service demands varying with concurrency for two exemplary Intel® Xeon® processors based on the Service Demand Law $S_i = U_i / X$, wherein $U_i$ is the resource utilization and X is the observed throughput. Exemplary applications used for validating the performance prediction models of the present disclosure include JPetStore, an open source version of Sun's PetStore application representing a database server CPU heavy application, eQuiz, another proprietary application representing a database server CPU heavy application that generates multiple pages for a quiz user to login, browse multiple quizzes, take tests and finally submit data for evaluation, and NxGCel, a proprietary application representing a web/application server CPU heavy application that allows user to choose cellular telephone plans and consists of multiple pages that allow browsing, observing popular plans, reviewing past usage statistics and determining roaming costs. Table 2 represents CPU configurations over which the applications were deployed for the validation.

TABLE 2

CPU hardware test configurations

| Configuration Name | CPU Model | Cache size | Cores \| Sockets | RAM | Disk size |
|---|---|---|---|---|---|
| Seahorse | Intel ® Xeon ® E5620 2.40 GHz | L1d: 32 KB L2: 256 KB L3: 12288 KB | 2 \| 2 | 12 GB | 300 GB |
| Shark | Intel ® Xeon ® E5620 2.40 GHz | L1d: 32 KB L2: 256 KB L3: 12288 KB | 4 \| 2 | 16 GB | 300 GB |
| Dolphin | Intel ® Xeon ® E5-2680 v3 2.50 GHz | L1d: 32 KB L2: 256 KB L3: 30720 KB | 4 \| 2 | 64 GB | 900 GB |
| Turtle | AMD Opteron™ 275 2.20 GHz | L1d: 64 KB L2: 1024 KB | 4 \| 2 | 4 GB | 80 GB |
| Whale | Intel ® Xeon ® E5620 2.40 GHZ | L1d: 32 KB L2: 256 KB L3: 12288 KB | 16 \| 2 | 16 GB | 300 GB |

As can be seen from FIGS. 4A and 4B, service demands vary (negative exponentially) with workload. In order to examine the effect of CPU hardware counters on service demand, multiple metrics at various load testing concurrencies were collected. Linux perf tool that generates various CPU performance metrics during load testing was used.

TABLE 3

A sample output of the perf Tool.

| | |
|---|---|
| 960599.228221 task-clock | # 16.010 CPUs utilized |
| 11,314 context-switches | # 0.012 K/sec |
| 46 cpu-migrations | # 0.000 K/sec |
| 3,942 page-faults | # 0.004 K/sec |
| 1,445,827,617 cycles | # 0.002 GHz |
| 2,247,536,127 stalled-cycles-frontend | # 155.45% frontend cycles idle |
| 1,659,269,991 stalled-cycles-backend | # 114.76% backend cycles idle |
| 665,425,825 instructions | # 0.46 insns per cycle |
| | # 3.38 stalled cycles/insns |
| 127,138,537 branches | # 0.132 M/sec |
| 5,885,345 branch-misses | # 4.63% of all branches |
| 26,210,588 cache-references | # 0.027 M/sec |
| 1,332,342 cache-misses | # 5.083% of all cache refs |

An analysis of certain CPU performance metrics are as follows:

Cache-hits/misses: Processors typically have ⅔ layers of data cache, where each layer increases with size and latency as we move out. The latest Intel® processors have 3 layers (L1D, L2, and L3); with sizes 32 KB, 256 KB, and 4-30 MB; and ~1 ns., ~4 ns., and ~15 ns.latency respectively for a 3.0 GHz CPU. Higher the cache-miss rate, higher the resulting service demands.

Context-switches: When the Linux scheduler decides to run another program or when an interrupt triggers a routine's execution, it steals a CPU from another running program. This process increases the time required to serve the request. So, an increase in context switching typically increases service demands.

CPU-migrations: On multi-processor systems Linux tries to keep the workload balanced among the available CPUs. This balancing is done both periodically and each time a CPU's queue is empty. CPU-migrations add to the delay overhead of service demands.

Page-faults: A page fault is an event happening each time a program needs part of its virtual memory's content to be copied in the physical memory. A page fault is signaled by the CPU via an interrupt: such an interrupt causes the execution of the page fault handling routine that loads the desired content in the physical memory. Page-faults add to the application delay overhead and increase the service demand.

Branches/branch-misses: For conditional instructions of applications, the CPU tries to predict which side of the branch will be running even before evaluating the branching condition. This is done by statistical means: if the CPU guesses the correct branch, some of its instructions will already be halfway through the pipeline. Higher the branch-miss rate, higher the resulting service demands.

Principal Component Analysis (PCA) is employed to identify the most meaningful basis to re-express a data set. PCA uses an orthogonal transformation to convert a set of observations of possibly correlated variables into a set of values of linearly uncorrelated variables. The PCA algorithm generates components that have minimal cross-correlation when applied to CPU performance metrics. Regression analysis is a statistical process for estimating the relationships between a dependent (endogenous) variable and one or more independent (exogenous) variables.

FIG. 5 illustrates a schematic flow diagram of a service demand modeling process. In order to accurately model service demands utilizing a single sample, (i) Utilization, throughput and cycle time values collected during a single-user test run with constant mean think time (time that user waits before performing actions); (ii) Application characteristics such as number of pages, page faults; (iii) Infrastructure characteristics such as CPU instructions, branch predictions and cache references are also captured. Endogenous variable service demand vector is related to multiple exogenous variables such as single work load (throughput, cycle time, throughput/response times of application pages, utilization of CPU/Disk/Network and one or more CPU performance metrics); application characteristics (page size, request size); infrastructure (cache size, Kernel processes), which are known variables. The objective is to capture the underlying changes in the CPU performance metrics that may be analyzed in conjunction with service demands. In general, factors reducing overheads among transactions (causes reduction in service time with workload) include:
  caching effects for common items showing better efficiencies at higher workloads;
  batching effects on performance;
  just in time compilation in case of Java®; and
  better branch prediction accuracies in CPUs.

Factors that cause contention among transactions (causes increase in service time with workload) include:
  cache contention due to uncommon items causing higher memory access times;

memory contention causing page faults; and
context switching affecting CPU service time.

In order to model service demand variation with workload, in an embodiment, the following methodology is employed:

(i) An application and corresponding hardware is selected for load tests. Using perf tool, CPU counters are collected during load tests with increasing concurrency. An example output is presented in Table 4 shown herein below.

TABLE 4

CPU counters collected (by perf) during load tests of JPetStore application running on a "Shark" category server.

| Concurrency | Service Demands sec | Context Switches K/sec | CPU Migrations K/sec | Page Faults K/sec | Branches G/sec | Branch Misses G/sec | Cache Hits M/sec | Cache Misses M/sec |
|---|---|---|---|---|---|---|---|---|
| 1 | 0.230 | 0.05 | 0.00 | 0.02 | 0.015 | 0.00048 | 0.22 | 0.04 |
| 5 | 0.0193 | 0.05 | 0.00 | 0.02 | 0.068 | 0.0022 | 0.47 | 0.21 |
| 10 | 0.0183 | 0.07 | 0.00 | 0.02 | 0.136 | 0.0045 | 0.75 | 0.40 |
| 20 | 0.0204 | 0.16 | 0.01 | 0.02 | 0.248 | 0.0082 | 2.19 | 1.10 |
| 40 | 0.0196 | 0.28 | 0.02 | 0.02 | 0.476 | 0.016 | 4.15 | 2.09 |
| 80 | 0.0196 | 0.93 | 0.13 | 0.02 | 0.598 | 0.019 | 5.81 | 2.72 |

(ii) The CPU utilization and throughput values with each workload are used to generate service demands using Service Demand Law $S_i = U_i/X$, wherein $U_i$ is the resource utilization and X is the observed throughput.

(iii) As the CPU hardware counters above have multiple dimensions and may have cross-correlations, dimensionality reduction with PCA is then employed.

(iv) Utilizing the CPU hardware metrics with the highest contributing indices, a regression function is formed that models service demands at higher workloads given a single-user input.

(v) This equation is then solved using least squared techniques and the values for the functions are estimated.

(vi) Steps (i)-(v) are repeated for other application/hardware configurations (referred to as the "training set") to verify/update the service demand model.

Using the above approach, the principal components that affect the service demands are extracted. As an example, the Eigenvectors corresponding to the highest Eigenvalues are shown in Table 5 for JPetSore on a "Shark" category server. As seen, the Eigenvector "weights" sum up to 1 in each column, cache-hits and cache-misses indicate dominant factors. Similar factors are observed for multiple applications across hardware platforms with the highest weights belonging to cache-hits and cache-misses, wherein almost 94% of the first Eigenvector is contributed to by the cache-hits and cache-misses.

TABLE 5

Principal Component Eigenvalues/Eigenvectors for metrics influencing service demands.

| Eigenvalues | 2.7366104 | 0.0289391 | 0.0014095 |
|---|---|---|---|
| Counters | \|Eigenvec.1\|² | \|Eigenvec.2\|² | \|Eigenvec.3\|² |
| Context-switches | 0.0358005 | 0.6585657 | 0.2549699 |
| CPU-migrations | 0.0006428 | 0.0203230 | 0.0098422 |
| Page-faults | 0.0000003 | 0.0000154 | 0.0002823 |
| Branches | 0.0196513 | 0.0181230 | 0.1667631 |
| Branch-misses | 0.0000214 | 0.0000207 | 0.0001832 |
| Cache-hits | 0.5079902 | 0.0660044 | 0.3816776 |
| Cache-misses | 0.4358937 | 0.2369478 | 0.1862816 |

Thus, in accordance with the present disclosure, cache-hit rate and cache-miss rate are the pre-defined CPU performance metrics that can be used to generate a regression function matching observed service demands at higher concurrencies.

Table 5 lists the results of PCA when applied to CPU counter measurements from training set tests. Out of all the CPU performance metrics measured using the perf tool, it was observed that the most dominant factors are cache-hit rate and cache-miss rate. Additionally, from experimental observations in FIGS. 4A and 4B, service demands follow an exponential decay with concurrency. The service demands have a lower bound (non-negative) and an upper bound due to the Service Demand Law (when cases where throughput does not drop extremely close to zero are considered). Such observations demonstrate that exponential curve fitting is a good choice for modeling service demand decay with workload.

For a single-user service demand measurement $S_k^1$, at higher concurrency n>1, the service demand may increase or decrease. At higher concurrency, two CPU hardware counters/CPU performance metrics: cache-hit rate $CH_k^n$ and cache-miss rate $CM_k^n$ are utilized. An increase in the cache-hit rate $CH_k^n$ with concurrency reduces the observed service demand; an increase in the cache-miss rate increases the service demand with concurrency. The resulting service demand can then be expressed as:

$$S_k^n = \begin{cases} S_k^1 \times e^{(-\alpha 1 CH_k^n)}, & \text{if } S_k^n \leq S_k^1 \\ S_k^1 \times e^{(+\alpha 2 CM_k^n)}, & \text{if } S_k^n \geq S_k^1 \end{cases}$$

Where positive regression coefficients $\alpha_1$, $\alpha_2$ are set according to least-squares regression. Combining these expressions, service demand S for any given concurrency n at a station k, utilizing single-user test measurements or a single workload can be expressed as:

$$S_k^n = S_k^1 \times e^{(-\alpha 1 \, CH_k^n + \alpha 2 \, CM_k^n)} \quad \text{Equation 1}$$

As a non-negative least squares (NNLS) algorithm always converges, the regression coefficients $\alpha_1$, $\alpha_2$ are set to match measured values, hence empirically proving the expression in Equation 1 is valid.

At step 206, a CPU performance metrics module 102C is configured to generate an array of one or more pre-defined CPU performance metrics based on the captured single workload. In an embodiment, as explained in the analysis herein above, the one or more pre-defined CPU performance metrics are cache-hit rate and cache-miss rate. FIG. 6A illustrates a schematic representation of a conventional single-core CPU service demand model and FIG. 6B illustrates a schematic representation of a new decomposed model based on cache-hit rate and cache-miss rate service demands. Input rate at which request queues are processed are provided as input to the service demand models while rate at which the requests are completed are provided as an output. FIG. 6B illustrates splitting of the request queues into two queues thereby reducing response time and improving throughput. As the memory access service demands are an order of magnitude greater than the cache-hit service demands, the variation in ratio of cache miss/memory access with increasing concurrency is captured by the model represented in FIG. 6B. For typical x86 processors, while the L1 and L2 cache access times are ~1 ns and ~7 ns, access to the main memory takes around ~100 ns. The update equations for cache-hit rate CH and cache-miss rate CM are specified as:

$$CH_k^n \leftarrow CH_k^1 \times \left(\frac{X^n}{X^1}\right)$$

$$CM_k^n = CM_k^1 \times \left(\frac{X^n}{X^1}\right)$$

Equations 2 and 3 wherein the updated metrics $CH_k^n$, $CM_k^n$ (units M/sec) are provided as a function of the single-user measurements $CH_k^1$, $CM_k^1$ and the throughput $X^n$ (estimated at concurrency n).

At step 208, a service demand module 102B is configured to generate an array of service demands based on the captured single workload and the generated array of the one or more pre-defined CPU performance metrics. In an embodiment, the one or more pre-defined CPU performance metrics are cache-hit rate (CH) and cache-miss rate (CM) and the array can be expressed as described herein above as $S_k^n$ (equation 1)

Each application/hardware configuration is thus modeled using measured throughput as a representative metric. This builds a cyclic relationship: measured throughput affects the cache-hit rate and cache-miss rate; the cache hits/misses in turn affect the service demands; the updated service demands impact the throughput.

Figure 7A:
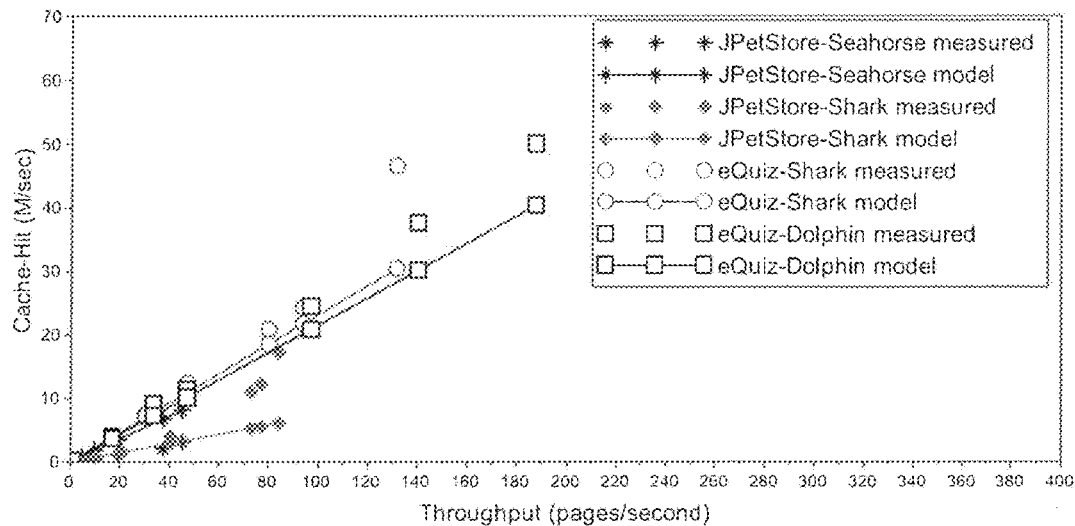
FIG. 7A and FIG. 7B illustrate graphical representations of cache-hit rate and cache-miss rate versus throughput respectively, pertaining to different application/hardware configurations in accordance with an embodiment of the present disclosure.
Figure 7B:
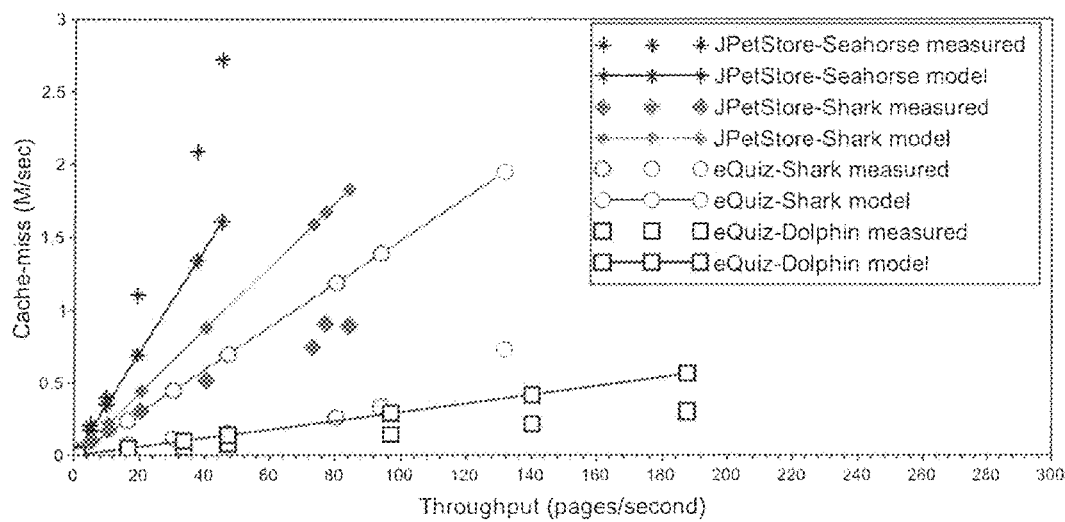

FIG. 7A and FIG. 7B illustrate graphical representations of cache-hit rate and cache-miss rate versus throughput respectively, pertaining to different application/hardware configurations in accordance with an embodiment of the present disclosure. Particularly, the graphical representations illustrate output of equations 2 and 3 provided herein above when applied to multiple application and hardware configurations. Even through slopes of the linear functions do not exactly match the measured values (as possible with regression), the service demand model of the present disclosure (Equation 1) is still able to distinguish between the configurations due to relative slopes of the linear models. The approximation introduced here is compensated by the NNLS Algorithm 2 regression coefficients, which match the measured service demands with the service demand model of the present disclosure (Equation 1). The added advantage of this approximation is that independent regression functions for a new configuration is not required; merely the single-user cache-hit/miss and throughput values provide the inputs for queuing, method of layers or simulation models. In conjunction with the signs of coefficients α1, α2 in equation 1, the service demand model of the present disclosure (Equation 1) is able to update service demand variation with workload.

Service demands for CPU/Disk vary with workload. MVA needs an array of service demands measured with increasing concurrency in order to estimate throughput and response times accurately. This may be described by a modified MVA technique provided by the Applicant in an earlier Indian Application No. 4053/MUM/2015 as:

$$X^n = \frac{n}{\sum_{k=1}^{K} \frac{SS_k^n}{C_k}\left(1 + Q_k + \sum_{j=1}^{C_k}(C_k - j)p_k(j)\right) + Z}$$

where $SS_k^n$ is a spline interpolated array of service demands. As the modified MVA technique of the earlier Indian Application also requires multiple sample points, load tests would have to be done to extract service demands. The present disclosure is directed at using a single workload in the MVA technique as described hereinafter.

At step 210, a single workload MVA module 102D is configured to compute an array of throughput based on the generated array of service demands. At step 212, the single workload MVA module 102D is further configured to update the generated array of the one or more pre-defined CPU performance metrics based on the computed array of throughput.

In an embodiment, computing an array of throughput comprises incorporating the generated array of service demands (equation 1) into a queueing network or a simulation model. In an embodiment, the queueing network is analyzed by recursively utilizing the updated array of the one or more pre-defined CPU performance metrics by a further modified Mean Value Analysis (MVA) as described and referred to hereinafter as SU-MVA or Single-User Service demand MVA.

Equation 1 provides the principal factors that affect CPU service demands that can be used to formulate the SU-MVA that recursively updates the variation. The SU-MVA technique includes an updated expression for service demands as a function of concurrency and CPU performance metrics. Modifications with respect to the multi-server MVA algorithm of Reiser and Lavenberg, as known, are shown underlined for added clarity.

Exact Mean Value Analysis Technique with Multi-Server Queues, Single-user Service Demands (SU-MVA):

Input: Queueing Station k with Number of servers $C^k$; Single User Service Demand $S_k^1$ and CPU Cache-Hits $CH_k^1$ and Cache-misses $CM_k^1$, Visit Counts $V^k$; Number of Concurrent Users N; Think Time Z; Single User Throughput $X^1$; Parameters α1 α2

Output: Throughput $X^n$ with increasing concurrency n∈N
For k←1 to N do
Initialize queues $Q_k$←0
Initialize multiserver probablities:
$p(k)_1$←1
For j←2 to $C_k$ do
    $p(k)_j$←1
For n←1 to N do
For k←1 to K do
Multi-server queue correction factor: $F_k \leftarrow \Sigma_{j=1}^{C_k}(C_k-j)p_k(j)$
Updated Service Demands: $S_k^n \leftarrow S_k^1 \times e^{-\alpha 1\ CH_k^n + \alpha 2 CM_k^n}$
Response Time at Each Station:

$$R_k^n \leftarrow \frac{S_k^n}{C_K}(1 + Q_k + F_k)$$

Throughput with Little's Law:

$$X^n \leftarrow \frac{n}{\sum_{k=1}^{K} V_k R_k + Z}$$

For k←1 to K do
Update Queues at each station: $Q_k \leftarrow X^n V_k R_k$
Update Utilization at each station: $U_k \leftarrow X^n S_k^n$
Update multi-server marginal probabilities:

$$p_k(1) \leftarrow 1 - \frac{1}{C_k}\left(X^n S_k^n + \sum_{j=2}^{C_k} p_k(j)\right)$$

For j←2 to $C_k$ do $$p_k(j) \leftarrow \frac{1}{j}(X^n S_k^n p_k(j-1))$$

Update CPU Counter Cache Hits:

$$CH_k^n \leftarrow CH_k^1 \times \left(\frac{X^n}{X^1}\right)$$

Update CPU Counter Cache Miss:

$$CM_k^n \leftarrow CM_k^1 \times \left(\frac{X^n}{X^1}\right)$$

Return: $X^n$

The updated model for SU-MVA estimation, in accordance with an embodiment, is represented as—

$$X^n = \frac{n}{\sum_{k=1}^{K} \frac{S_k^1 \times e^{-\alpha_1 CH_k + \alpha_2 CM_k}}{C_k}\left(1 + Q_k + \sum_{j=1}^{C_k}(C_k - j)p_k(j)\right) + Z} \quad \text{Equation 4}$$

which incorporates the service demand model (equation 1) and the cache-hit/cache-miss update models (equations 2 and 3).

Starting with the single-user inputs of service demands for each station ($S_k^1$), cache-hits/miss at single-user load ($CH_k^1$ $CM_k^1$) and throughput at single-user load $X^1$, the technique is able to automatically update service demands. As a single-user test is utilized, the only caveat is that "steady state" values are collected. In summary, the update process makes use of the following functional relationships:

$S^n = F(CH^n, CM^n)$ (as seen in equation 1)

$CH^n = F(CH^1, X^n, X^1)$ (as seen in equation 2)

$CM^n = F(CM^1, X^n, X^1)$ (as seen in equation 3)

$X^n = F(n)$ (as derived from the SU-MVA technique above)

As MVA can iteratively calculate throughput (X) as a function of concurrency (n), S can be derived as a function of concurrency $X^n = F(n)$, which can be called the service demand model.

Experimental Data

Experiments were performed to demonstrate efficacy of the service demand model; the generated outputs were then input to SU-MVA which is then compared with other prediction models for predicting accuracy.

Service Demand Model Accuracy:

In order to test the accuracy of the prediction methodology, JpetStore, eQuiz and NxGCel applications were tested under various CPU hardware configurations. As shown in Table 6 below, a subset of the application/hardware configurations were used as the "training" set to extract the parameter values to solve equation 1.

TABLE 6

Test sets used for service demand model training and validation

| Configuration | Bottleneck CPU | Test Set | $S^1$ ms | Mean Residual % |
|---|---|---|---|---|
| JPetStore-Seahorse | Database | Training | 23:00 | 14.34 |
| JPetStore-Shark | Database | Training | 10.46 | 7.6 |
| JPetStore-Dolphin | Database | Training | 11.40 | 10.68 |
| NxGCel-Seahorse | Application | Training | 16.92 | 8.94 |
| NxGCel-Shark | Application | Training | 3.75 | 11.23 |
| eQuiz-Shark | Database | Training | 5.54 | 12.88 |
| eQuiz-Dolphin | Database | Training | 6.80 | 14.82 |
| JPetStore-Turtle | Database | Validation | 35.53 | 5.70 |
| JPetStore-Whale | Database | Validation | 5.00 | 12.66 |
| NxGCel-Whale | Application | Validation | 1.18 | 9.58 |

Two tiers of servers were used in the setup with the web/application and the database servers having similar configurations. The Grinder output and Linux performance monitors were used during the tests to collect metrics needed for the analysis. The tests were run sufficiently long (15-20 mins.) to remove transient behavior. To evaluate the service demand model coefficients, the expression used was:

$$\log_e(S_k^n) = \log_e(S_k^1) - \alpha 1\ CH_k^n + \alpha 2\ CM_k^n$$

and then solved using the non-negative least squares technique to estimate the values $\alpha_1 = 0.0202$ and $\alpha_2 = 0.0864$, giving equation 1 as:

$$S_k^n = S_k^1 \times e^{(-0.0202 CH_k^n + 0.0864 CM_k^n)} \quad \text{Equation 5}$$

Equation 5 in conjunction with the SU-MVA technique enables predicting the performance with a single workload. The cache-hit and cache-miss ratio are updated according to the collected single-user pert output. It is noted that the generated $\alpha_1$ and $\alpha_2$ values are now independent of the applications under test. This is by the virtue of the regression across the training set. Due to the accuracy of the NNLS Algorithm 2 regression fit, some of the approximations introduced in the cache hit/miss update (equations 2 and 3) are mitigated. This provides an approximate regression fit that may be employed with a variety of applications.

Figure 8A:
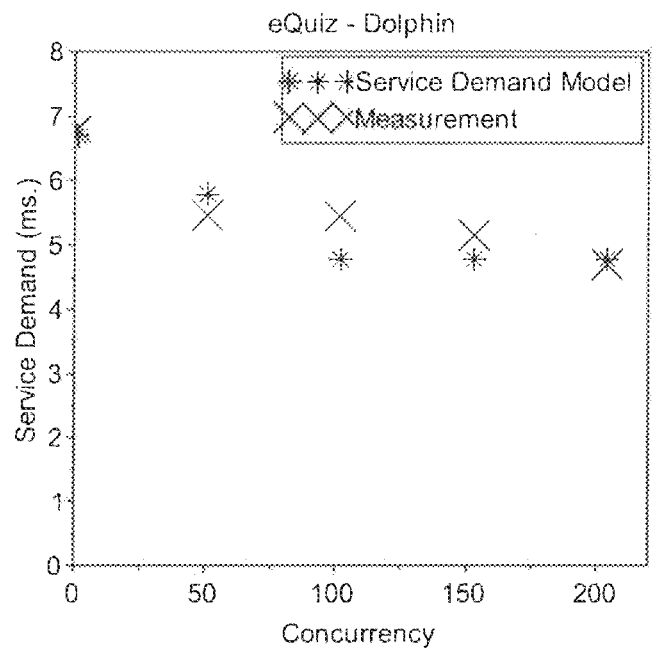
FIG. 8A and FIG. 8B demonstrate the accuracy of the service demand estimation model when applied to varied application/hardware configurations in accordance with an embodiment of the present disclosure.
Figure 8B:
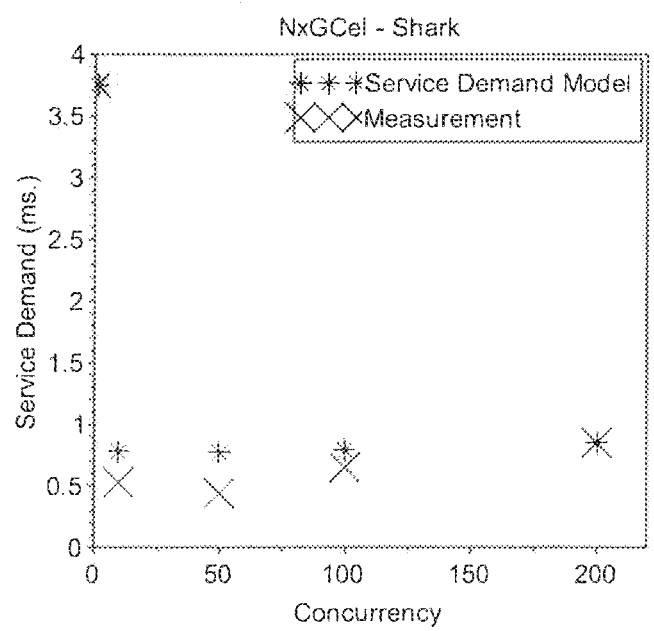

Table 6 analyzes the mean regression residual % seen with the single-user service demand models. Also included are the validation test outputs (bold) that are not used in the regression function tuning. It is noted that for all cases, the mean deviation of the regression model and the measured service demands are low. This demonstrates that the update equation (equation 5) is a reliable regression model for service demands across varied application/hardware configurations. The values need not be re-estimated for a new setting, which saves valuable testing time and effort. FIG. 8A and FIG. 8B demonstrate the accuracy of the service demand estimation model when applied to varied application/hardware configurations in accordance with an embodiment of the present disclosure. Due to the versatility of the service demand model, it can be applied to CPU bound applications when used with differing hardware configurations.

Figure 9:
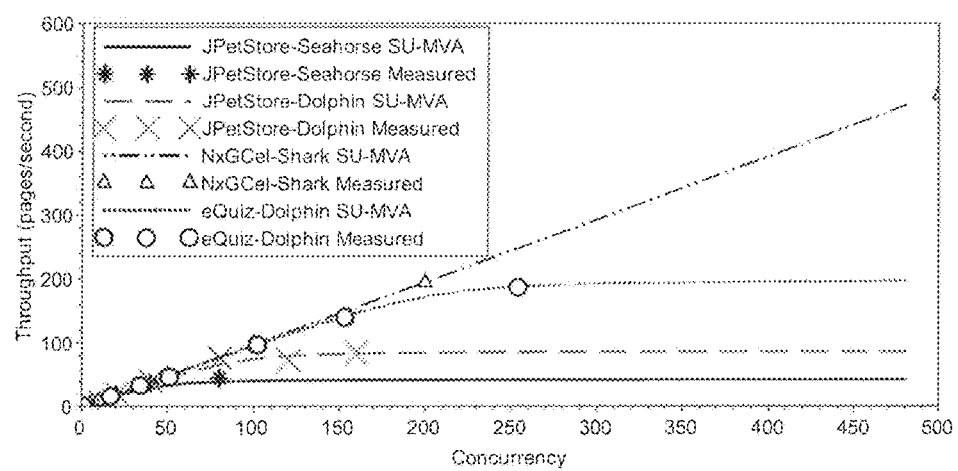
FIG. 9 illustrates a graphical representation of throughput (pages/second) versus concurrency for a plurality of application/hardware configurations in accordance with an embodiment of the present disclosure.
Figure 10A:
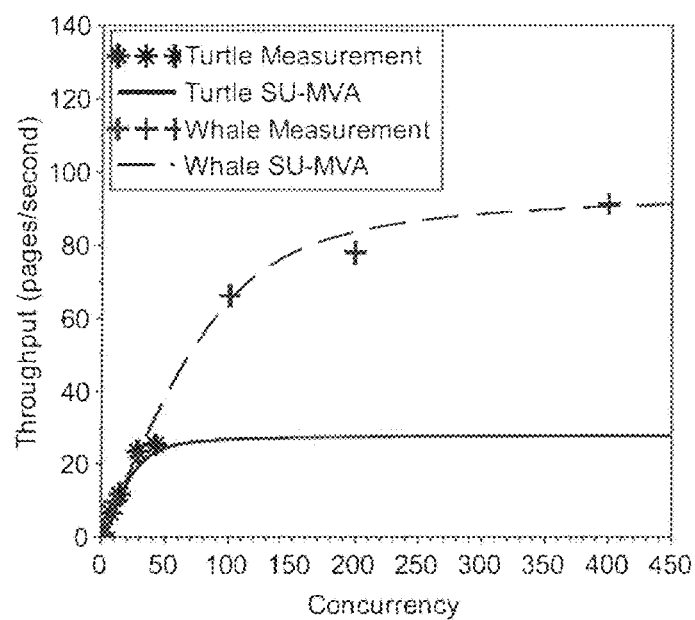
FIG. 10A and FIG. 10B illustrate throughput (pages/second) versus concurrency for JPetStore applications running on "Turtle" and "Whale" category servers in accordance with an embodiment of the present disclosure.
Figure 10B:
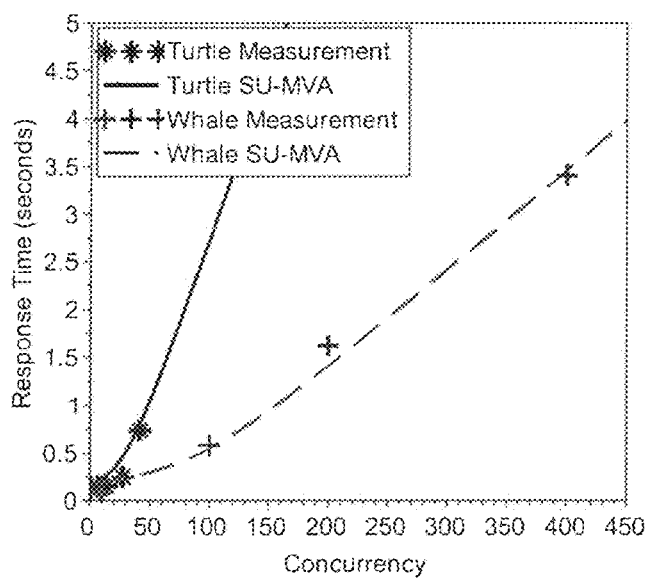

Performance Prediction Accuracy:

FIG. 9 illustrates a graphical representation of throughput (pages/second) versus concurrency for a plurality of application/hardware configurations in accordance with an embodiment of the present disclosure. Particularly, FIG. 9 compares the throughput measurements for various (application/database server CPU heavy) application and hardware configurations when predicted with the SU-MUV technique. The think time Z=1 sec. in all these cases. Even though the input is a single service demand value, the SU-MVA technique is able to predict with accuracy the variations in these metrics for all configurations. It is noted that by single-user service demands, the number of users are set to 1 (bold in Table 1) for the load tests. It may also be envisioned to apply to cases where users manually browse pages in application transactions and corresponding resource usages are monitored provided steady-state metrics are derived. While service demand and CPU counters measured for FIG. 9 are included in the training set, FIG. 10A and FIG. 10B illustrate the performance of SU-MVA on a new validation dataset. Particularly, FIG. 10A and FIG. 10B illustrate throughput (pages/second) versus concurrency for JPetStore applications running on "Turtle" and "Whale" category servers with the service demands/CPU metrics not included in the training set. The Turtle server has a 4-core AMD CPU while the Whale server has a 16-core Intel® CPU. The SU-MVA technique is able to accurately predict performance in both cases as the multi-server MVA has been appended with the service demand update equation. The response times derived with the SU-MVA technique are also found to match the measurements. For values of response times that are measured at higher concurrency in case of JPetStore-Whale, the deviations in prediction were found to be 5:82% (N=100), 9:26% (N=200) and 0:38% (N=400). These validation results demonstrate that the generated service demand model (equation 5) is accurate with the set values of α1 and α2 applicable to a variety of applications. It validates the modeling technique of the present disclosure for CPU bound applications. This methodology can be extended for other application/hardware configuration sets to further validate the model, Table 6 herein below displays the % deviations seen for throughput prediction with various algorithms.

TABLE 7

Mean deviation in performance prediction for various application/hardware configurations.

| Configuration | CPU Server Bottleneck | N* | X* | MVA $X_p^*$ | % Dev | PerfCenter $X_p^*$ | % Dev | SU-MVA $X_p^*$ | % Dev |
|---|---|---|---|---|---|---|---|---|---|
| JPetStore-Seahorse | Database | 80 | 45.08 | 49.94 | 10.78 | 72.92 | 61.76 | 39.69 | 6.37 |
| JPetStore-Shark | Database | 160 | 87.56 | 110.97 | 26.74 | 97.12 | 10.92 | 90.67 | 3.55 |
| JPetStore-Dolphin | Database | 160 | 84.08 | 104.03 | 23.72 | 89.87 | 6.88 | 83.61 | 0.56 |
| NxGCel-Seahorse | Application | 500 | 487.80 | 333.13 | 31.71 | 60.94 | 87.51 | 490.00 | 0.45 |
| NxGCel-Shark | Application | 500 | 487.80 | 262.57 | 46.17 | 269.82 | 44.68 | 490.00 | 0.45 |
| eQuiz-Shark | Database | 153 | 131.58 | 180.27 | 37.00 | 163.67 | 24.38 | 138.30 | 5.11 |
| eQuiz-Dolphin | Database | 254 | 187.51 | 146.87 | 21.67 | 220.00 | 17.32 | 174.90 | 6.72 |
| JPetStore-Turtle | Database | 42 | 25.34 | 31.21 | 23.16 | 31.10 | 22.73 | 23.30 | 8.05 |
| JPetStore-Whale | Database | 400 | 91.12 | 186.09 | 104.23 | 81.50 | 10.56 | 90.80 | 0.35 |
| NxGCel-Whale | Application | 1500 | 1279.00 | 827.24 | 35.24 | 844.64 | 33.96 | 1339.80 | 4.69 |

The measured throughput values X* at high concurrency N* are compared with those predicted by the algorithms ($X_p^*$). It is noticed that the mean deviation for SU-MVA is low in most cases with the maximum deviation being less than 9% (validation test outputs bold). Considering that the prediction just makes use of a single-user test in all cases, this result is promising for cases where either the database or application servers' CPU are bottlenecks. For the multi-server MVA, when a single-user service demand was input, high deviation (approx. 104% highest dev. on validation set) in predicted outputs were observed. This once again highlights the need to capture variation in service demand inputs to MVA algorithms. The output performance is also compared with PerfCenter which makes use of method of layers as an underlying model. PerfCenter was also input the single-user service demands, with the resulting predictions compared with load test measurements. Superior performance of the technique of the present disclosure was noticed when compared to that of PerfCenter (approx. 34% highest dev. on validation set).

Figure 11A:
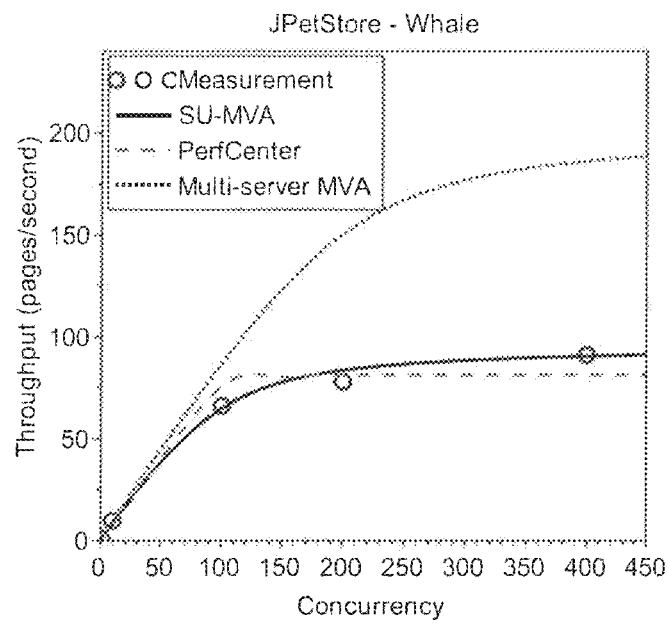
FIG. 11A and FIG. 11B illustrate graphical representation of throughput (pages/second) versus concurrency with various techniques such as SU-MVA, PerfCenter and MVA.
Figure 11B:
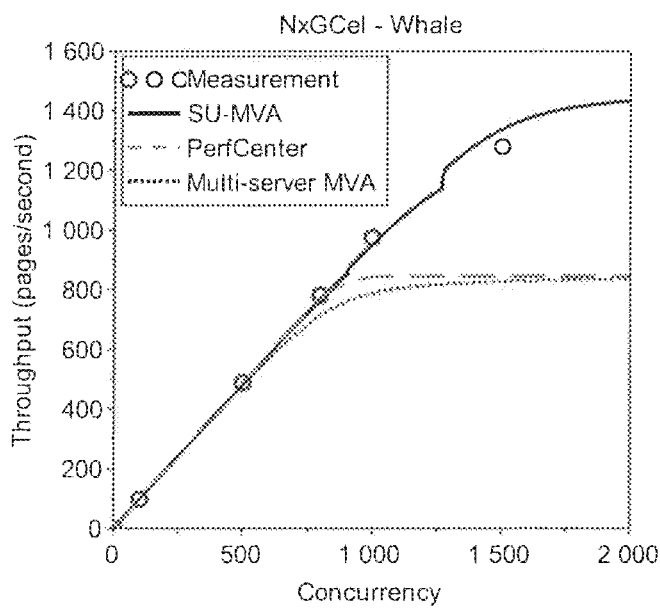

FIG. 11A and FIG. 11B illustrate graphical representation of throughput (pages/second) versus concurrency with various techniques such as SU-MVA, PerfCenter and MVA. Particularly FIG. 11A and FIG. 11B illustrate instances of the performance of these techniques when applied to validation sets for JPetStore/NxGCel applications. It is noted that multi-server MVA and Perfcenter predictions are inferior to those of SU-MVA. This once again highlights the importance of accurate service demand modeling with workload.

The present disclosure utilizes single workload or single-user test inputs and is particularly directed to CPU bottlenecks in the performance of applications. "Steady-state" service demand values are extracted for the single-user tests. This typically involves loading the server iteratively over a prolonged period in order to estimate metrics. Scaling of the CPU performance metrics such as cache-hits/cache-misses is approximated by the scaling of throughput with workload. While dynamic frequency scaling seen in most modern processors affect the service demands, the "performance" governor is set to restrict this behavior in the present disclosure.

The present disclosure thus provides: a study the variation of service demands with workload and consequent effect on performance prediction; an analysis of CPU performance metrics and correlation with service demand variations; extracting a relationship to estimate service demands as a function of CPU performance metrics with increasing concurrency; provides an extended version of the MVA algorithm (SU-MVA) that can take in a single-user test input or single workload and a couple of CPU performance metrics to recursively update service demand variations; and demonstrates over multiple application/hardware infrastructures the efficacy of throughput predictions using this methodology and comparative evaluation against existing techniques/tools, The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein, Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

It is intended that the disclosure and examples be considered as exemplary only, with a true scope and spirit of disclosed embodiments being indicated by the following claims.

What is claimed is:

1. A method for service demand based performance prediction of an application under test using a single workload, the method comprising:
    identifying, by one or more processors, a range of concurrencies for the application under test;
    capturing, by the one or more processors a single workload pertaining to the application under test; and
    iteratively performing, by the one or more processors, for the identified range of concurrencies:
        generating an array of one or more pre-defined central processing unit (CPU) performance metrics generated during load testing of the application based on the captured single workload;
        generating an array of service demands for a CPU based on the captured single workload and the generated array of the one or more pre-defined CPU performance metrics;
        computing an array of throughput based on the generated array of service demands; and
        updating the generated array of the one or more pre-defined CPU performance metrics based on the computed array of throughput, wherein the iteratively performing includes generating a linear regression function that models variation of the service demands with the single workload, inputs the variation to a modified Mean Value Analysis (MVA) to generate a performance output with the single workload and update the variation of the service demands based on the updated array of the one or more pre-defined CPU performance metrics.

2. The method of claim 1, wherein the one or more pre-defined CPU performance metrics are cache-hit rate and cache-miss rate.

3. The method of claim 1, wherein generating the array of one or more pre-defined CPU performance metrics is based on the one or more pre-defined CPU performance metrics and throughput derived from the captured single workload.

4. The method of claim 1, wherein computing the array of throughput comprises incorporating the generated array of service demands into a queueing network or a simulation model.

5. The method of claim 4, wherein the queueing network is analyzed by recursively utilizing the updated array of the one or more pre-defined CPU performance metrics by the MVA.

6. A system for service demand based performance prediction of an application under test using a single workload, the system comprising:
one or more processors;
one or more data storage devices operatively coupled to the one or more processors and configured to store instructions configured for execution by the one or more processors to:
identify a range of concurrencies for the application under test;
capture a single workload pertaining to the application under test; and
iteratively perform for the identified range of concurrencies:
generate an array of one or more pre-defined central processing unit (CPU) performance metrics generated during load testing of the application based on the captured single workload;
generate an array of service demands for a CPU based on the captured single workload and the generated array of the one or more pre-defined CPU performance metrics;
compute an array of throughput based on the generated array of service demands; and
update the generated array of the one or more pre-defined CPU performance metrics based on the computed array of throughput, wherein the iteratively performing includes generating a linear regression function that models variation of the service demands with the single workload, inputs the variation to a modified Mean Value Analysis (MVA) to generate a performance output with the single workload and update the variation of the service demands based on the updated array of the one or more pre-defined CPU performance metrics.

7. The system of claim 6, wherein the one or more pre-defined CPU performance metrics are cache-hit rate and cache-miss rate.

8. The system of claim 6, wherein the one or more processors are further configured to generate the array of one or more pre-defined CPU performance metrics based on the one or more pre-defined CPU performance metrics and throughput derived from the captured single workload.

9. The system of claim 6, wherein the one or more processors are further configured to compute the array of throughput by incorporating the generated array of service demands into a queueing network or a simulation model.

10. The system of claim 9, wherein the one or more processors are further configured to analyze the queueing network by recursively utilizing the updated array of the one or more pre-defined CPU performance metrics by the MVA.

11. One or more non-transitory machine readable information storage media comprising one or more instructions which when executed by one or more hardware processors cause:
identifying, by the one or more processors, a range of concurrencies for the application under test;
capturing, by the one or more processors a single workload pertaining to the application under test; and
iteratively performing, by the one or more processors, for the identified range of concurrencies:
generating an array of one or more pre-defined central processing unit (CPU) performance metrics generated during load testing of the application based on the captured single workload;
generating an array of service demands for a CPU based on the captured single workload and the generated array of the one or more pre-defined CPU performance metrics;
computing an array of throughput based on the generated array of service demands; and
updating the generated array of the one or more pre-defined CPU performance metrics based on the computed array of throughput, wherein the iteratively performing includes generating a linear regression function that models variation of the service demands with the single workload, inputs the variation to a modified Mean Value Analysis (MVA) to generate a performance output with the single workload and update the variation of the service demands based on the updated array of the one or more pre-defined CPU performance metrics.

12. The one or more non-transitory machine readable information storage media of claim 11, wherein the one or more pre-defined CPU performance metrics are cache-hit rate and cache-miss rate.

13. The one or more non-transitory machine readable information storage media of claim 11, further comprising generating the array of one or more pre-defined CPU performance metrics is based on the one or more pre-defined CPU performance metrics and throughput derived from the captured single workload.

14. The one or more non-transitory machine readable information storage media of claim 11, wherein computing the array of throughput comprises incorporating the generated array of service demands into a queueing network or a simulation model.

15. The one or more non-transitory machine readable information storage media of claim 14, wherein the queueing network is analyzed by recursively utilizing the updated array of the one or more pre-defined CPU performance metrics by the MVA.

* * * * *